US008280305B2

(12) United States Patent
Tamura

(10) Patent No.: US 8,280,305 B2
(45) Date of Patent: Oct. 2, 2012

(54) CONTENT PLAYER

(75) Inventor: Toshiya Tamura, Kokubunji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 780 days.

(21) Appl. No.: 12/401,688

(22) Filed: Mar. 11, 2009

(65) Prior Publication Data

US 2010/0075597 A1 Mar. 25, 2010

(30) Foreign Application Priority Data

Sep. 19, 2008 (JP) ................................ 2008-241324

(51) Int. Cl.
*H04B 5/00* (2006.01)
*G06F 17/30* (2006.01)
(52) U.S. Cl. ............................. 455/41.1; 707/E17.044
(58) Field of Classification Search ............ 707/E17.044, 707/100, 513, E17.009; 386/240; 455/41.1
See application file for complete search history.

(56) References Cited

U.S. PATENT DOCUMENTS

| | | | |
|---|---|---|---|
| 7,356,334 B2 * | 4/2008 | Yamashita | 455/420 |
| 7,373,658 B1 * | 5/2008 | Blumenfeld et al. | 726/9 |
| 7,831,557 B2 | 11/2010 | Matsutani | |
| 7,983,526 B2 * | 7/2011 | Ando et al. | 386/240 |

FOREIGN PATENT DOCUMENTS

| | | |
|---|---|---|
| JP | 2001-266551 A | 9/2001 |
| JP | 2006-094414 A | 4/2006 |
| JP | 2006-179141 A | 7/2006 |
| JP | 2007-164852 A | 6/2007 |

OTHER PUBLICATIONS

JP Office Action dated Feb. 28, 2012 as received in application No. 2008-241324.
JP Office Action mailed on Jun. 26, 2012 as received in application No. 2008-241324.

* cited by examiner

*Primary Examiner* — Dinh T. Le
(74) *Attorney, Agent, or Firm* — Maschoff Gilmore & Israelsen

(57) ABSTRACT

There is provided a content player including: a communication module that performs a near field communication with a remote control device; a content storage section that stores content data; a playlist storage section that stores folders and playlists including a root folder as a root node and playlists as leaf nodes; a current location storage section configured to store current location information indicating a current location of a node in the playlist storage section; a current location notification module that controls the near field communication module to send the current location information to the remote control device; and a playback module configured to: set the root folder as the current location; change the current location; and play back content data having the identification information being included in the playlist.

7 Claims, 15 Drawing Sheets

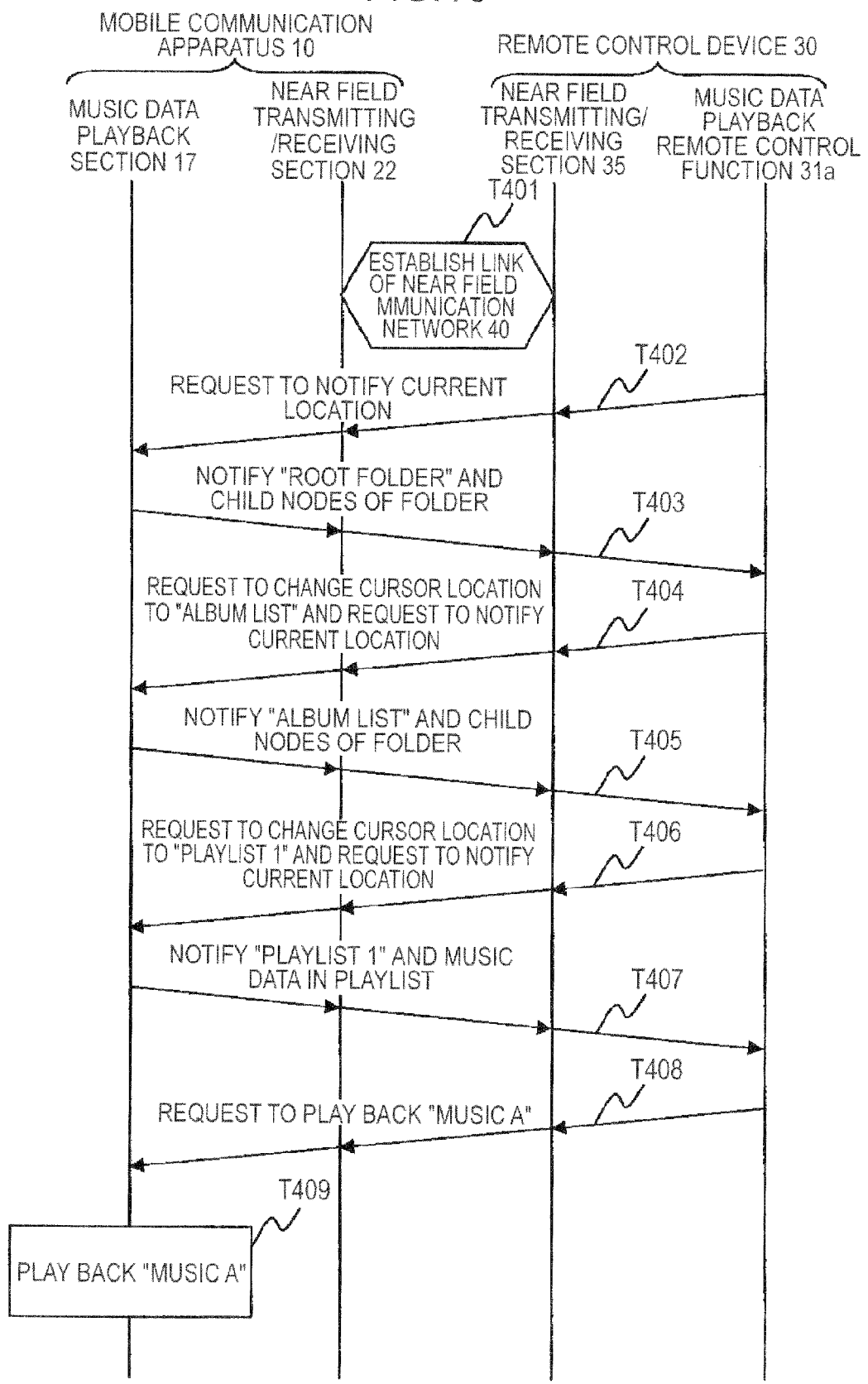

CONTENT PLAYER

CROSS-REFERENCE TO RELATED APPLICATIONS

The entire disclosure of Japanese Patent Application No. 2008-241324 filed on Sep. 19, 2008, including specification, claims, drawings and abstract is incorporated herein by reference in its entirety.

BACKGROUND

1. Field of the Invention

One aspect of the invention relates to a content player, and in particular, to a processing for selecting content data to play back.

2. Description of the Related Art

There is a technology which selects music data to play back based on an operation from an input section, and also receives a control signal by a near field communication, for example, a control signal according to an Audio/Video Remote Control (AVRCP) profile of Bluetooth (Registered Trademark), and selects music data to play back based on the control signal. That is, the AVRCP profile defines control regarding selection of a music player, acquisition of a playlist for each selected music player, acquisition of music data information, playback of music data, and the like.

The playlist is a list of music data, and the music data in the playlist are sequentially played back or a designated music data from among the music data in the playlist is played back. The playlist has a tree structure in which a root folder is used as a root node (a top node), other folders are stored as child nodes of the root node, and one or a plurality of playlists are stored as child nodes of these folders. The playlists are leaf nodes and have no child node. Hereinafter, the folders and the playlists having a tree structure are referred to as a folder-structured playlist.

A playlist is acquired, for example, by selecting a folder and selecting one of playlists as child nodes of the folder (for example, see JP-A-2006-94414). When a new folder is selected, a folder which is a parent node or a child node of a currently selected folder is selected.

Hereinafter, the selected folder is referred to as a folder of a current location, and the selected playlist is referred to as a playlist of a current location. In other words, the current location means a selected node in the tree structure.

However, in the method disclosed in JP-A-2006-94414, when a playlist is acquired in the playlists and folders having a tree structure, there may be a problem in that it is not clear which node in the tree structure is the current location. More specifically, there may be a problem in that the current location when a playlist is acquired in the folder-structured playlist is not clear.

SUMMARY

There is provided a content player including: a near field communication module configured to perform a near field communication with a remote control device; a content storage section configured to store content data; a playlist storage section configured to store folders and playlists having a tree structure including a root folder as a root node and a plurality of playlists as leaf nodes, each playlist including a group of identification information of the content data; a current location storage section configured to store current location information indicating a current location of a node being selected in the playlist storage section; a current location notification module configured to control the near field communication module to send the current location information to the remote control device; and a playback module configured to: set the root folder as the current location; change the current location; and play back content data having the identification information being included in the playlist at the current location.

BRIEF DESCRIPTION OF THE DRAWINGS

Embodiment may be described in detail with reference to the accompanying drawings, in which:

FIG. 15 is an exemplary sequence diagram (second view) of communication between the music data playback remote control function and the music data playback section when the music data playback control function and the music data playback remote control function according to the embodiment of the invention control the music data playback section.

DETAILED DESCRIPTION OF THE EMBODIMENTS

Figure 1:
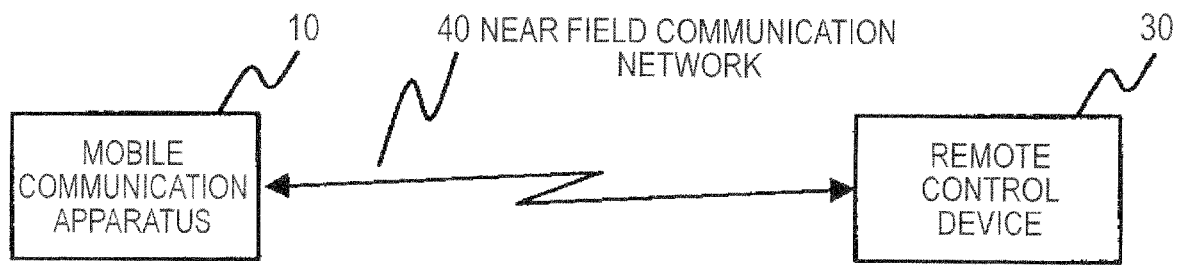
FIG. 1 is an exemplary block diagram showing a configuration of a playback control system including a mobile communication apparatus according to an embodiment of the invention.

FIG. 1 is a block diagram showing a configuration of a playback control system having a mobile communication apparatus, to which a content player according to an embodiment of the invention is applied.

The playback control system includes a mobile communication apparatus 10 that is connected to a mobile communication network (not shown), a remote control device 30, and a near field communication network 40 that connects the mobile communication apparatus 10 and the remote control device 30. The mobile communication apparatus 10 performs communication through the mobile communication network and plays back music data. Music data to be played back is selected according to an input from an input section in the mobile communication apparatus 10 and a control signal transmitted from the remote control device 30 through the near field communication network 40. The near field communication network 40 is a communication network based on the profile of the Bluetooth system, including the AVRCP profile.

Figure 2:
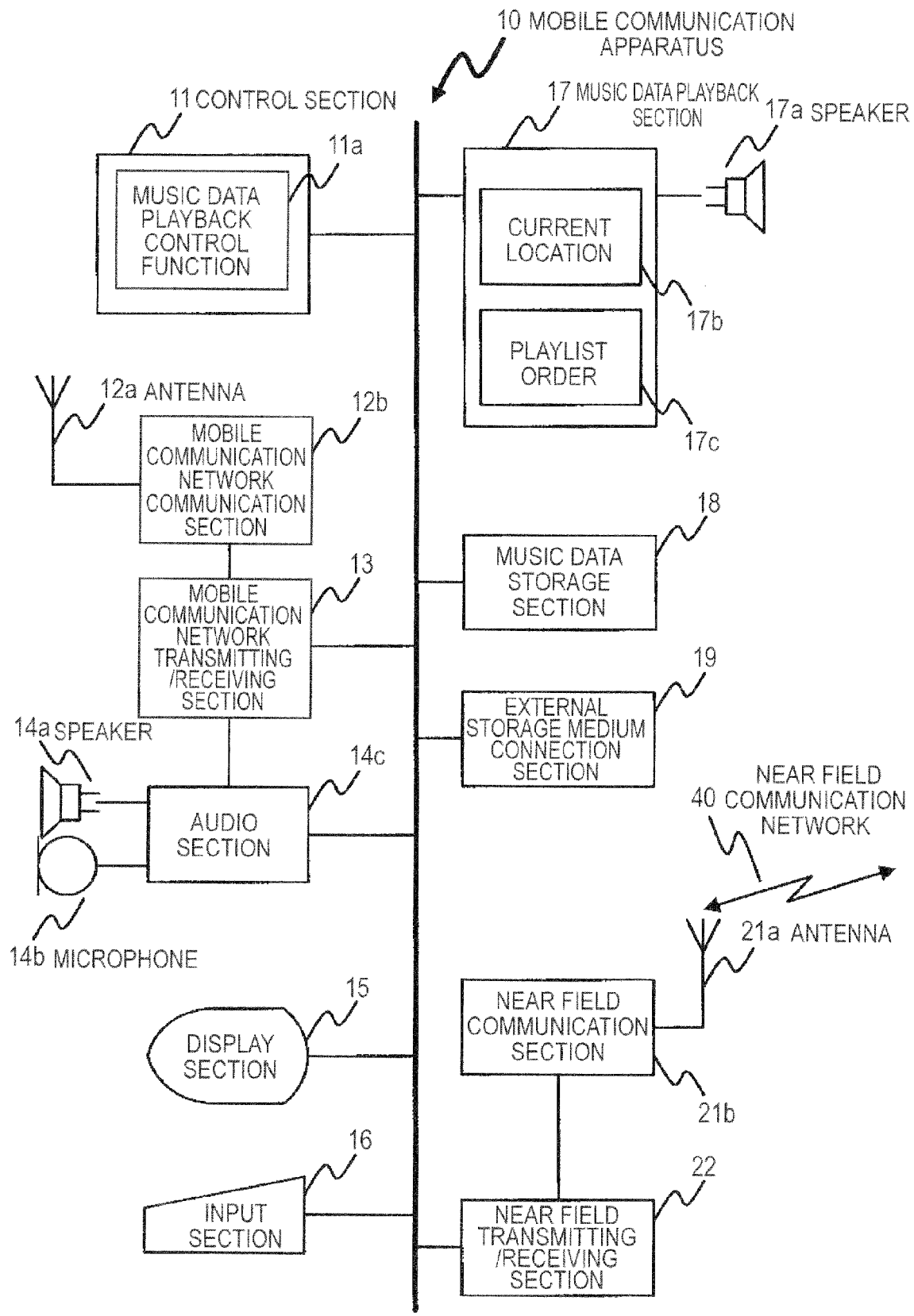
FIG. 2 is an exemplary block diagram showing a configuration of the mobile communication apparatus according to the embodiment of the invention.

FIG. 2 is a block diagram showing the configuration of the mobile communication apparatus 10. The mobile communication apparatus 10 includes a control section 11 that controls the entire apparatus, an antenna 12a that transmits radio waves to the mobile communication network or receives radio waves from the mobile communication network, a mobile communication network communication section 12b, a mobile communication network transmitting/receiving section 13, a speaker 14a that is used to receive speech, a microphone 14b that is used to input speech, an audio section 14c, a display section 15 that performs information presentation for a user, an input section 16 through which the user inputs an operation instruction, a music data playback section 17, a speaker 17a for music data playback, a music data storage section 18, an external storage medium connection section 19 to which an external storage medium, such as an SD card or the like, is removably connected, an antenna 21a that transmits or receives radio waves of near field communication, a near field communication section 21b, and a near field transmitting/receiving section 22.

The control section 11 has a music data playback control function 11a to be implemented by running a program.

The music data playback section 17 stores a current location 17b and a playlist order 17c. The music data storage section 18 stores a music data and a folder-structured playlist. The music data are coded sound signal data that is received from a contents server apparatus (not shown) through the base station and the mobile communication network communication section 12b by a contents download section (not shown), or is input through the external storage medium connected to the external storage medium connection section 19, and are played back by the music data playback section 17. The music data include attributes, such as an identifier, a title, an artist name, and the like. The music data is riot limited to music signal data.

The folder-structured playlist has a tree structure in which a playlist, which is a list of identifiers of music data, is stored as a leaf node of the tree structure. Nodes other than the playlist are folders. A proper subtree of the folder-structured playlist having a tree structure can be stored in the external storage medium connected to the external storage medium connection section 19. The proper subtree is a subtree not including a root folder serving as a root node. In other words, the root folder serving as a root node is constantly stored in the music data storage section 18.

Figure 3:
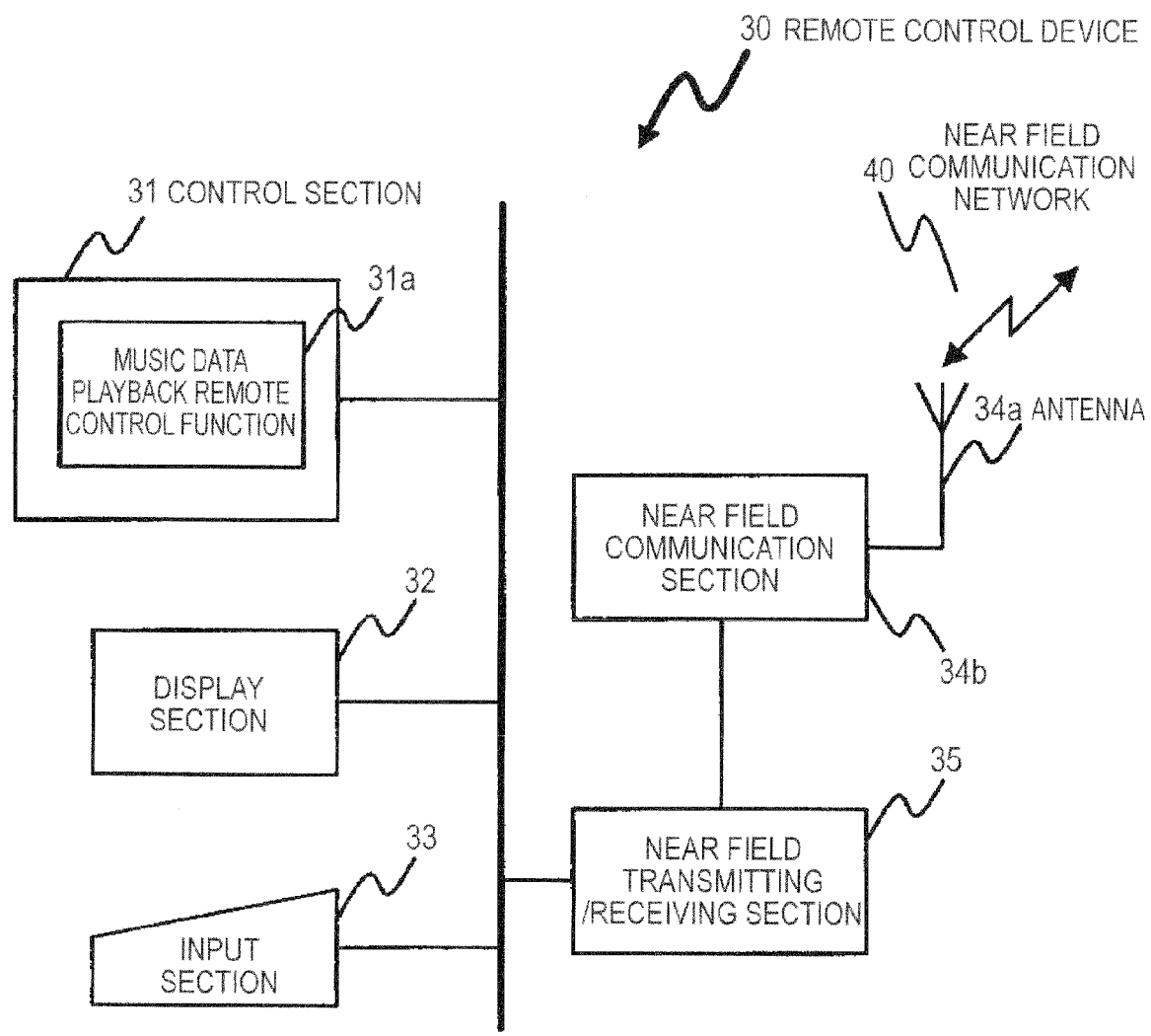
FIG. 3 is an exemplary block diagram showing a configuration of a remote control device according to the embodiment of the invention.

FIG. 3 is a block diagram showing the configuration of the remote control device 30. The remote control device 30 includes a control section 31 that controls the entire device, a display section 32 that displays information for the user, an input section 33 through which the user inputs an operation instruction, an antenna 34a that transmits or receives radio waves of near field communication, a near field communication section 34b, and a near field transmitting/receiving section 35.

The display section 32 and input section 33 are implemented as a touch panel. The user operates the input section 33 by touching a portion, in which a soft key is displayed, on a display screen of the display section 32 with his/her finger.

The control section 31 has a music data playback remote control function 31a implemented as a program.

First, the operations of the individual sections of the mobile communication apparatus 10 will be described with reference to FIG. 2. The mobile communication network communication section 12b transmits a high-frequency signal, which is received through the antenna 12a, to the mobile communication network transmitting/receiving section 13. The mobile communication network communication section 12b transmits a high-frequency signal, which is transmitted from the mobile communication network transmitting/receiving section 13, through the antenna 12a.

The mobile communication network transmitting/receiving section 13 amplifies, frequency-converts, and demodulates the high-frequency signal transmitted from the mobile communication network communication section 12b, transmits a demodulated digital sound signal to the audio section 14c, and transmits a control signal to the control section 11. The mobile communication network transmitting/receiving section 13 also modulates, frequency-converts, and amplifies a digital sound signal transmitted from the audio section 14c and a control signal transmitted from the control section 11, and transmits an amplified high-frequency signal to the mobile communication network communication section 12b.

The audio section 14c converts the digital sound signal transmitted from the mobile communication network transmitting/receiving section 13 into an analog sound signal, amplifies the analog sound signal, and sends the amplified analog sound signal to the speaker 14a. The audio section 14c also amplifies an analog sound signal inputted through the microphone 14b, converts the amplified analog sound signal into a digital sound signal, and transmits the digital sound signal to the mobile communication network transmitting/receiving section 13.

The display section 15 includes, for example, an LCD and displays characters/numerals or video data under the control of the control section 11. Data being displayed is switched in response to an input signal from the input section 16 and according to the operation of the music data playback section 17.

The input section 16 includes a plurality of key switches. If a key of the input section 16 is operated, the identifier of the corresponding key is notified to the control section 11, and the control section 11 controls the individual sections of the mobile communication apparatus 10. For example, the control section 11 controls the display section 15 to display a character corresponding to the operated key.

The music data playback section 17 is activated based on a request from the music data playback control function 11a and a request from the near field transmitting/receiving section 22, decodes a music data stored in the music data storage section 18, and outputs decoded sound through the speaker 17a.

The music data playback section 17 displays the folder-structured playlist stored in the music data storage section 18 on the display section 15 or transmits the folder-structured playlist to the near field transmitting/receiving section 22. The music data playback section 17 sequentially decodes music data in a selected playlist or decodes a designated music data in the playlist, and outputs sound through the speaker 17a.

The music data playback section 17 stores a selected node of the tree structure of the folder-structured playlist in the current location 17b of the music data playback section 17. When music data in the playlist is selected, where the selected music data is in the playlist order is stored in the playlist order 17c of the music data playback section 17.

The near field communication section 21b transmits a near field communication high-frequency signal, which is received from the near field communication network 40 through the antenna 21a, to the near field transmitting/receiving section 22. The near field communication section 21b also transmits a high-frequency signal, which is transmitted from the near field transmitting/receiving section 22, to the near field communication network 40 through the antenna 21a. The near field communication uses, for example, the Bluetooth system, but it may use a wireless LAN system or an infrared communication system.

The near field transmitting/receiving section 22 amplifies, frequency-converts, and demodulates the high-frequency signal received by the near field communication section 21b, and transmits a demodulated control signal to the music data playback section 17. The near field transmitting/receiving section 22 also receives the folder-structured playlist transmitted from the music data playback section 17, modulates, frequency-converts, and amplifies the folder-structured playlist, and transmits an amplified high-frequency signal to the near field communication section 21b.

The near field transmitting/receiving section 22 transmits the control signal received by the near field communication section 21b to the music data playback section 17 and transmits information transmitted from the music data playback section 17 to the near field communication section 21b, whereby the remote control device 30 is able to operate as a remote control device of the music data playback section 17. The music data playback section 17 is controlled not just by a signal from the music data playback control function 11a but also by a signal from the near field transmitting/receiving section 22.

The mobile communication apparatus 20 play back music data using the music data playback section 17, the speaker 17a, the music data playback control function 11a, the display section 15, the input section 16, the music data storage section 18, the external storage medium connection section 19, the antenna 21a, the near field communication section 21b, and the near field transmitting/receiving section 22.

The music data playback control function 11a receives a key operation of the input section 16 to control the music data playback section 17, and transmits a request corresponding to the received key operation to the music data playback section 17. The music data playback control function 11a also controls the display section 15 to display the folder-structure playlist transmitted from the music data playback section 17.

The operations of the individual sections of the remote control device 30 will be described with reference to FIG. 3. The display section 32 includes, for example, an LCD and displays characters/numerals or video data under the control of the control section 31. Data being displayed is switched in response to an input signal from the input section 33 and according to information received by the near field transmitting/receiving section 35.

As described above, the input section 33 and the display section 32 are implemented as a touch panel. Therefore, the input section 33 includes soft keys displayed on the display section 32 and notifies a signal for identifying a soft key operated by the user to the control section 31. The user operates soft keys displayed on the display section 32 by touching these keys.

The near field communication section 34b transmits a near field communication high-frequency signal, which is received from the near field communication network 40 through the antenna 34a, to the near field transmitting/receiving section 35. The near field communication section 34b also transmits a high-frequency signal, which is transmitted from the near field transmitting/receiving section 35, to the near field communication network 40 through the antenna 34a. The system of near field communication is the same as described in the operation description of the near field communicator section 21b.

The near field transmitting/receiving section 35 amplifies, frequency-converts, and demodulates the high-frequency signal received by the near field communication section 34b, and sends demodulated information, for example, the folder-structure playlist to the music data playback remote control function 31a. The near field transmitting/receiving section 35 also modulates, frequency-converts, and amplifies a control signal transmitted from the music data playback remote control function 31a, and transmits an amplified high-frequency signal to the near field communication section 34b.

The music data playback remote control function 31a receives an operation at the input section 33 for controlling the music data playback section 17, and transmits a request corresponding to the received operation to the near field transmitting/receiving section 35. The music data playback remote control function 31a also controls the display section 15 to display information transmitted from the near field transmitting/receiving section 35.

The folder-structured playlist having a tree structure to be stored in the music data storage section 18 will now be described in detail.

Figure 4:
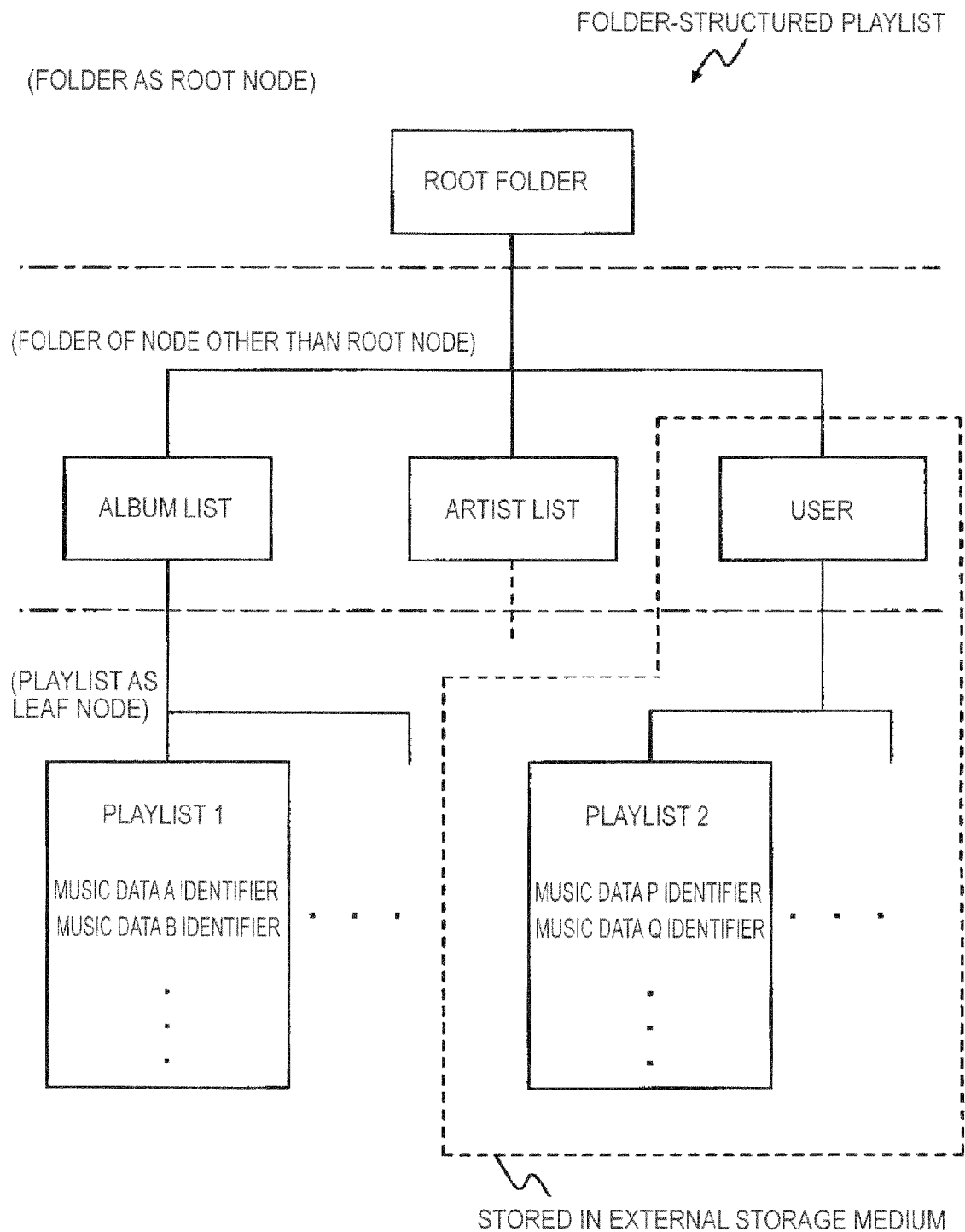
FIG. 4 is a diagram showing an example of a folder-structured playlist having a tree structure according to the embodiment of the invention.

FIG. 4 shows an example of the folder-structured playlist having a tree structure, in which "ROOT FOLDER" serving as a root node is stored and the folders "ALBUM LIST", "ARTIST LIST", and "USER" as child nodes of the root node are stored in an ordering manner. In addition, the playlists "PLAYLIST 1", . . . as child nodes of the folder "ALBUM LIST" and leaf nodes are stored in an ordering manner, and the playlists "PLAYLIST 2", . . . as child nodes of the folder "USER" and leaf nodes are stored in an ordering manner.

In "PLAYLIST 1", "MUSIC DATA A IDENTIFIER", "MUSIC DATA B IDENTIFIER", . . . , which are a list of identifiers of music data, are stored in an ordering manner. In "PLAYLIST 2", "MUSIC DATA P IDENTIFIER", "MUSIC DATA Q IDENTIFIER", . . . , which are a list of identifiers of music data, are stored in an ordering manner.

The shown folder-structured playlist has three levels, but it may have any number of levels. The number of levels may vary according to subtree. A node as a folder may have a child node as a folder and a child node as a playlist. Meanwhile, a node as a playlist has no child node.

It is assumed that a subtree having the folder node "USER" as a root node is stored in the external storage medium connected to the external storage medium connection section 19. Accordingly, when the external storage medium is removed from the external storage medium connection section 19, the subtree stored in the external storage medium is not read out.

When the external storage medium is removed while the music data playback section 17 is playing back music data whose identifier is included in a playlist stored in the external storage medium (for example, "MUSIC P" whose identifier is included in "PLAYLIST 2"), the music data playback section 17 continuously plays back the music data. This is because, after music data to be played back by the music data playback section 17 is decided, it is not necessary to refer to the playlist.

The operation of the mobile communication apparatus 10 to play back music data in a playlist in the playback control system having the above-described configuration will be described. For example, it is assumed that the music data B in "PLAYLIST 1" of FIG. 4 is played back.

(First Operation)

Figure 5:
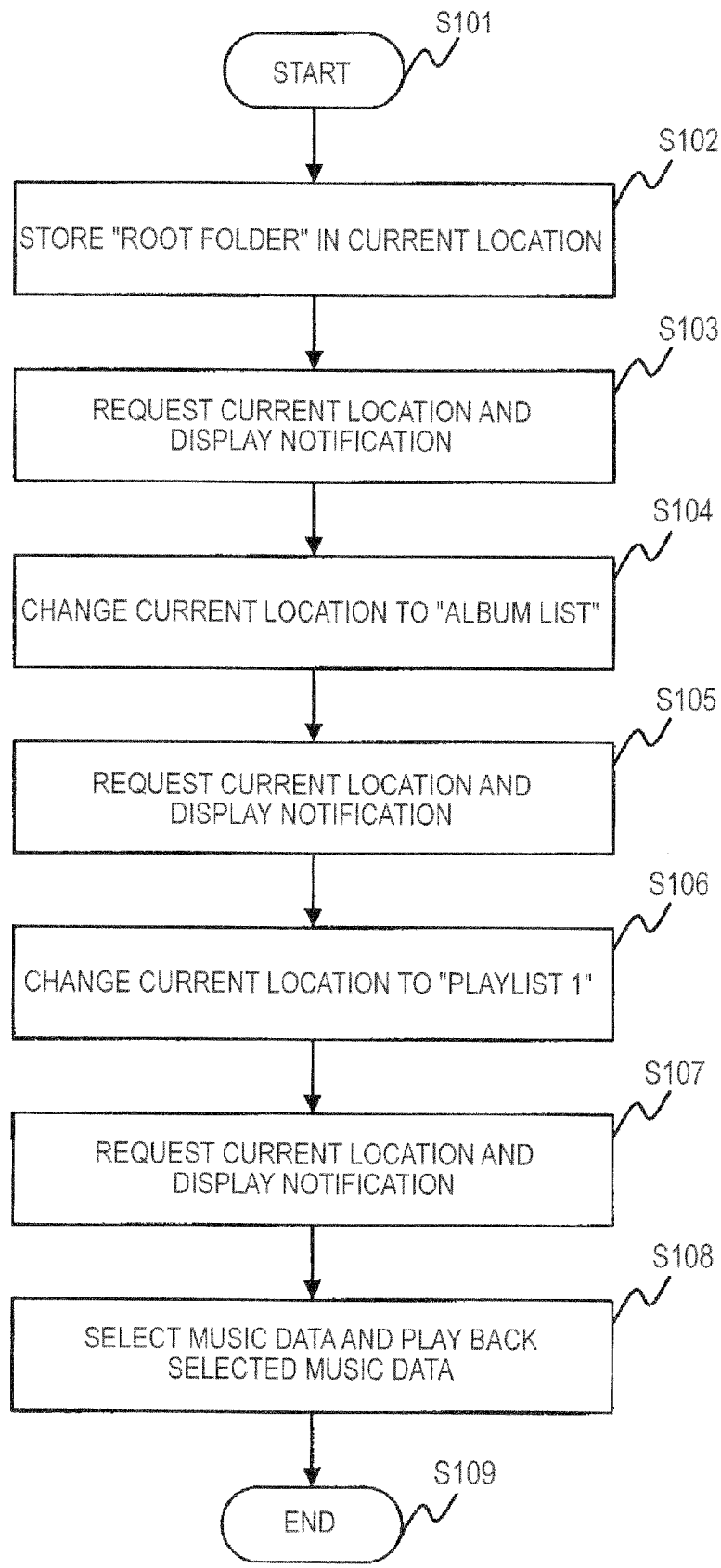
FIG. 5 is an exemplary flowchart illustrating an operation of music data playback control function according to the embodiment of the invention to cause playback of music data included in a playlist when a music data playback section is not in operation.

FIG. 5 is a flowchart illustrating an operation of the music data playback control function 11a to cause playback of music data included in a playlist according to a key operation of the input section 16 when the music data playback section 17 is not in operation.

The music data playback control function 11a starts to operate based on a key operation of the input section 16, and since the music data playback section 17 is riot in operation, activates the music data playback section 17 (Step S101). At the beginning of the operation, the music data playback section 17 stores the value "ROOT FOLDER" in the current location 17b, and erases a value stored in the playlist order 17c (Step S102).

The music data playback control function 11a automatically requests the music data playback section 17 to notify the current location based on a key operation of the input section 16 or without depending on a key operation. In response to this request, the music data playback section 17 notifies the value "ROOT FOLDER" stored. In the current location 17b. In this case, since the current location 17b is a folder, the music data playback section 17 also notifies the child nodes of the folder as a folder or a playlist distinctly. The music data playback control function 11a displays the notified information on the display section 15 (Step S103).

Figure 6:
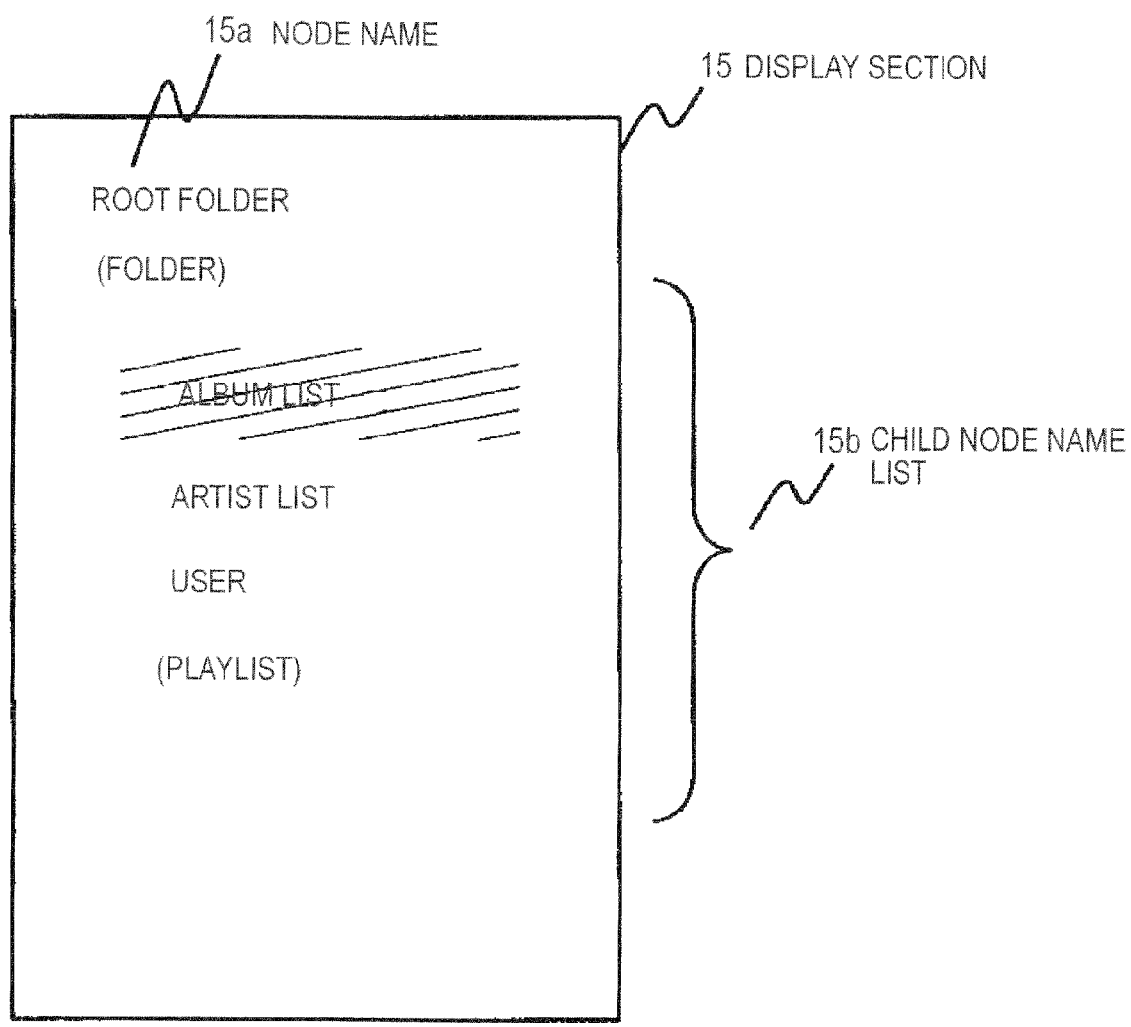
FIG. 6 is a diagram (first view) showing an example where the music data playback control function according to the embodiment of the invention displays information regarding a folder of a current location.

FIG. 6 shows the content to be displayed on the display section 15 in Step S103. On the display section 15, node name "ROOT FOLDER", and child node name list "ALBUM LIST", "ARTIST LIST", and "USER" are displayed. In Step S103, "ROOT FOLDER" has no playlist as child node, so playlist name is not displayed.

In FIG. 6, a cursor is positioned at one node name in the child node name list 15b. A node name at which a cursor is positioned is displayed differently from other node names. In FIG. 6, hatching is used to represent that the cursor is positioned, and the cursor is positioned at "ALBUM LIST". The cursor is changed to a node name displayed on an upper or lower side by an operation of an up or down key of the input section 16.

The music data playback section 17 does not inform the music data playback control function 11a of the default position of the cursor in the child node name list 15b. Therefore, at the beginning of the display, the music data playback control function 11a displays the cursor at a node displayed on an uppermost side.

The operation to cause playback of music data will be further described with reference to the flowchart of FIG. 5. The music data playback control function 11a sends a request to change the current location to a node (in the example of FIG. 6, "ALBUM LIST"), at which the cursor is positioned, to the music data playback section 17 by an operation of a key at the input section 16, for example, an enter key. In response to this request, the music data playback section 17 stores two values "ROOT FOLDER" and "ALBUM LIST" in the current location 17b in an ordering manner (Step S104). The reason why two values are stored is to uniquely identify a folder corresponding to the current location from folders having the same name.

Subsequently, the music data playback control function 11a requests the music data playback section 17 to notify the current location. In this case, the value "ALBUM LIST" at the right end from the values stored in the current location 17b is a folder, and thus the current location 17b is a folder. Therefore, in response to the above request, the music data playback section 17 notifies the values "ROOT FOLDER" and "ALBUM LIST" stored in the current location 17b, and the child nodes of the folder as a folder or a playlist distinctly. The music data playback control function 11a displays the notified information on the display section 15 (Step S105).

Figure 7:
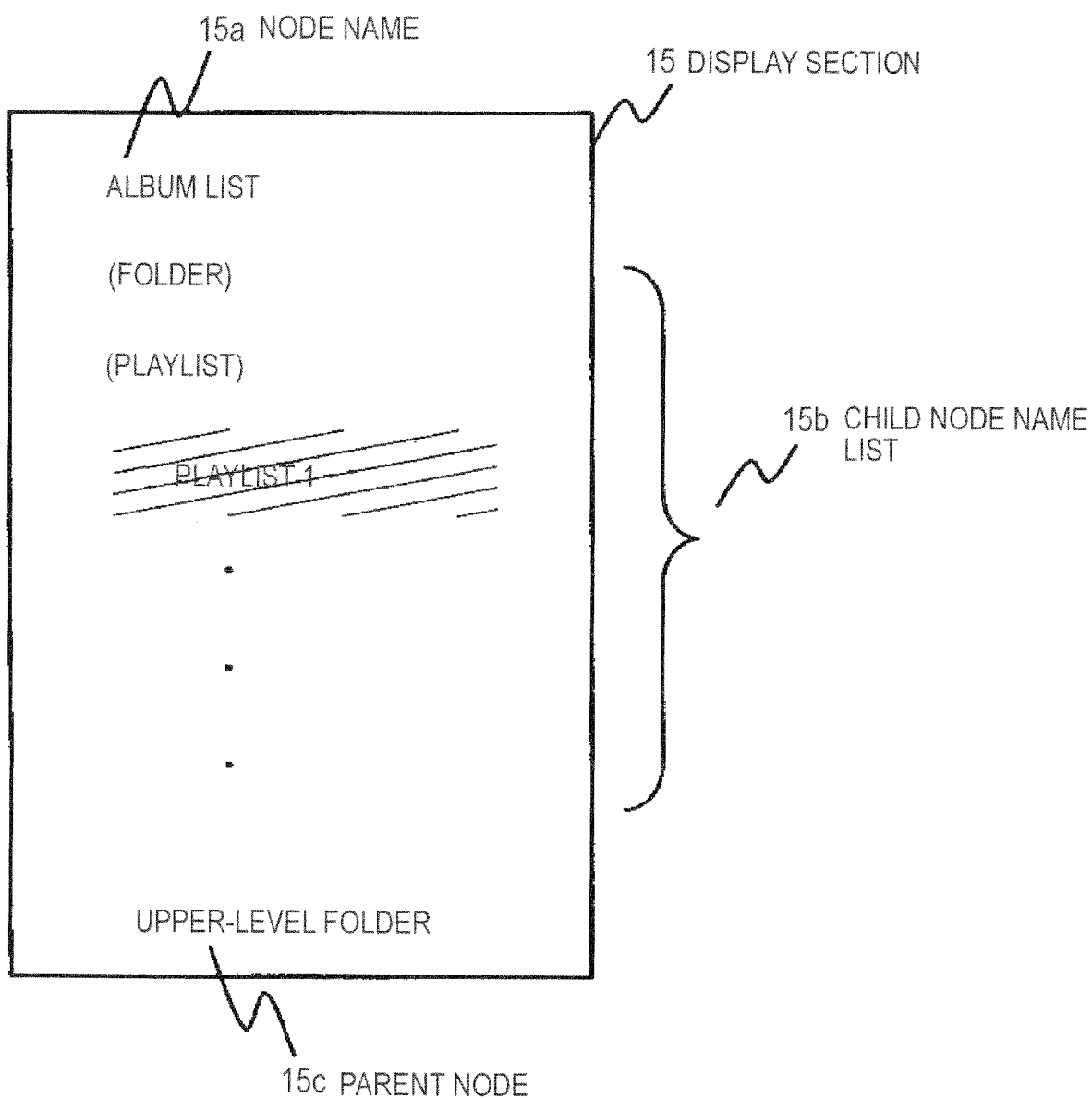
FIG. 7 is a diagram (second view) showing an example where the music data playback control function according to the embodiment of the invention displays information regarding a folder of a current location.

FIG. 7 shows the content to be displayed on the display section 15 in Step S105. On the display section 15, node name "ALBUM LIST", no folder name, and child node name "PLAYLIST 1" as the playlist names are displayed. In addition, parent node change display 15c, "UPPER-LEVEL FOLDER", is displayed. A description for the cursor is the same as described with reference to FIG. 6. When the child node name list starts, the cursor is positioned in the same manner as described with reference to FIG. 6.

The operation to cause playback of music data will be further described with reference to the flowchart of FIG. 5. The music data playback control function 11a sends a request to change the current location to a node name (in the example of FIG. 7, "PLAYLIST 1"), at which the cursor is located, to the music data playback section 17 by an operation of, for example, the enter key of the input section 16. In response to this request, the music data playback section 17 stores the values "ROOT FOLDER", "ALBUM LIST", and "PLAYLIST 1" in the current location 17b (Step S106). The reason why a plurality of values are stored is to identify uniquely a node, as described above.

If a predetermined function key of the input section 16 is operated, the music data playback control function 11a sends a request to change the current location to parent node "UPPER LEVEL FOLDER", that is, a parent node of a node currently stored in the current location 17b to the music data playback section 17. In response to this request, the music data playback section 17 stores the value "ROOT FOLDER" in the current location 17b.

The music data playback control function 11a requests the music data playback section 17 to notify the current location In response to this request, the music data playback section 17 notifies the values "ROOT FOLDER", "ALBUM LIST", and "PLAYLIST 1" stored in the current location 17b. In this case, since the value at the right end of these values is a playlist, the current location 17b is a playlist. Therefore, the music data playback section 17 also notifies a list, in which the titles of music included in the playlist are ordered, and the playlist order 17c.

A list of identifiers of music data is stored in the playlist, and by searching the attributes of music data with an identifier as a search key, the title of music is obtained. The music data playback control function 11a control the display section 15 to display the notified information (Step S107).

Figure 8:
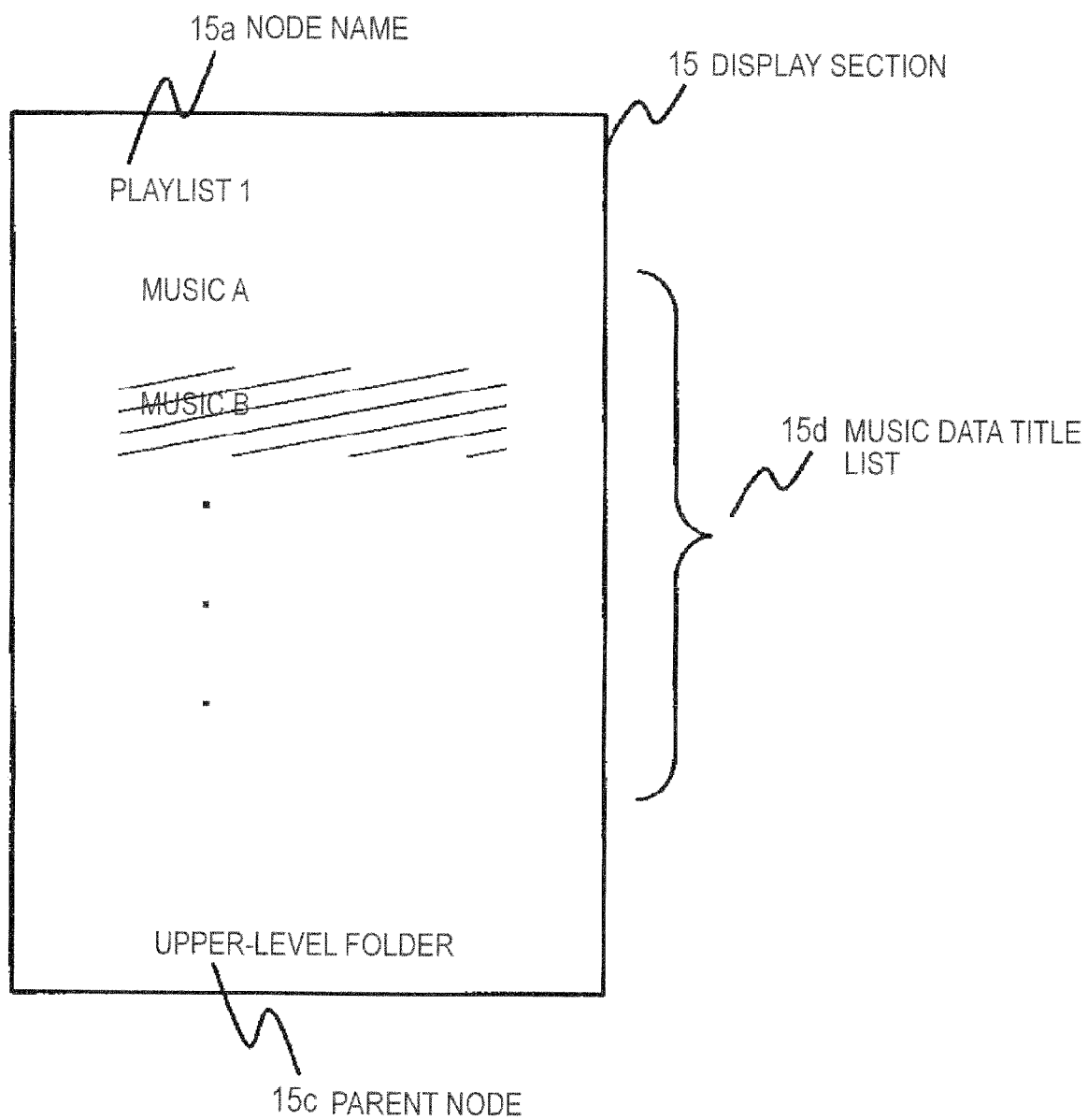
FIG. 8 is a diagram showing an example where the music data playback control function according to the embodiment of the invention displays information regarding a playlist of a current location.

FIG. 8 shows the contents to be displayed on the display section 15 in Step S107. On the display section 15, node name "PLAYLIST 1", music data title list "MUSIC A", "MUSIC B", and parent node "UPPER-LEVEL FOLDER" are displayed.

The cursor is positioned at one of the titles of music in the music data title list "MUSIC B" in FIG. 8. Further description for the cursor is the same as described with reference to FIG. 6. Music data at which the cursor is positioned is music data which is selected as an object to play back. Each time music data at which the cursor is positioned is changed, the music data playback control function 11a requests the music data playback section 17 to store the music data (in FIG. 8, "MUSIC B") at which the cursor is positioned. Specifically, the music data playback control function 11a notifies the music data playback section 17 of information regarding where the music data is in the playlist order, and the music data playback section 17 stores the notified number in the playlist order 17c.

The music data playback section 17 notifies the music data playback control function 11a of the playlist order 17c, which shows the default position of the cursor in the music data title list 15d. However, in this case, the value of the playlist order 17c is erased in Step S11, the music data playback control function 11a cannot decide a title of music, at which the cursor is positioned, based on the playlist order 17c. Therefore, the cursor is positioned at the top of the playlist, that is, a title of music on the uppermost side.

The operation to cause playback of music data will be further described with reference to the flowchart of FIG. 5. The music data playback control function 11a requests the music data playback section 17 to play back music data selected by an operation of, for example, the enter key of the input section 16 or all music data included in the playlist from the selected music data. With respect to the selected music data, the information regarding where the selected music data is in the playlist order has already been notified to the music data playback section 17. Therefore, the music data playback section 17 searches music data to be identified by the playlist order 17c from the music data and plays back the searched music data (Step 108).

Before or after playback of music data is requested, the music data playback control function 11a may request the music data playback section 17 for the details of the selected music data based on a predetermined key operation at the input section 16. In this case, the music data playback section 17 notifies attribute information of music data to be identified by the current location 17b and the playlist order 17c to the music data playback control function 11a. The music data playback control function 11a controls the display section 15 to display the notified information (not shown).

After playback of music data is requested, the music data playback control function 11a may request the music data playback section 17 to perform volume control of music data being played back, pause, select and play back another music data in the playlist, end playback, or the like (not shown), and ends the operation (Step S109). The music data playback section 17 plays back the selected music data or all music data included in the playlist from with the selected music data.

When music data being played back is changed, the music data playback section 17 updates and stores the playlist order 17c in order to set music data being played back as a selected music data. Each time the playlist order 17c is updated and stored, the music data playback section 17 may notify the music data playback control function 11a that the playlist order 17c is updated and stored.

The music data playback control function 11a may request the music data playback section 17 to notify the current location 17b and/or the playlist order 17c, thereby displaying the title of music data being played back on the display section 15. In addition, the music data playback control function 11a may request the music data playback section 17 for the details of the selected music data, thereby displaying attribute information of music data being played back on the display section 15.

In an arbitrary operation step, the music data playback section 17 waits for a request from the music data playback control function 11a. When this request is not input over a threshold time, the operation ends. The operation of the music data playback section 17 is performed regardless of after or before the music data playback section 17 ends playback of music data.

(Second Operation)

Figure 9:
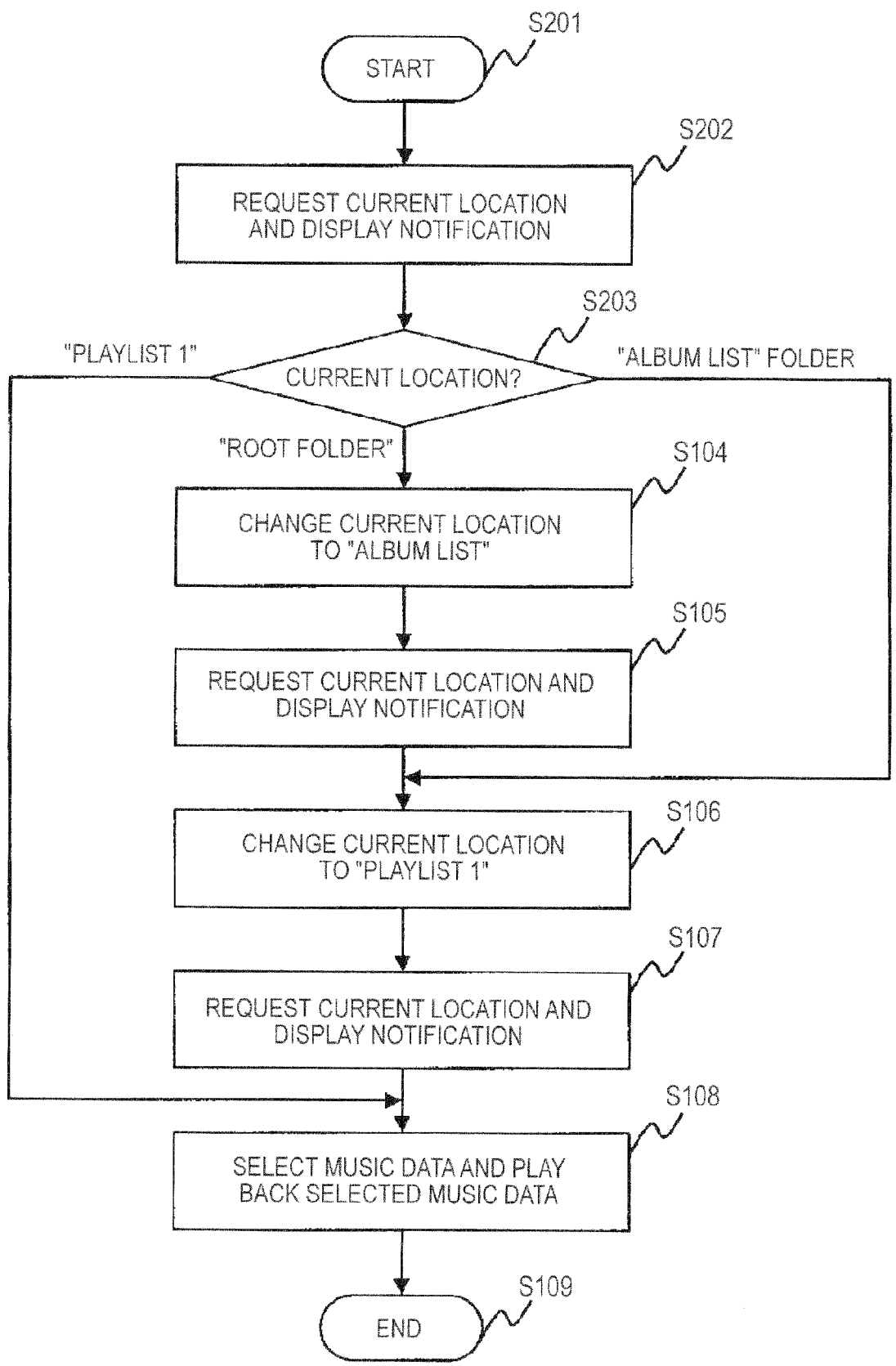
FIG. 9 is an exemplary flow chart illustrating an operation of the music data playback control function according to the embodiment of the invention to cause playback of music data included in a playlist when the music data playback section is in operation.

FIG. 9 is a flowchart illustrating an operation of the music data playback control function 11a to cause playback of music data included in a playlist according to a key operation of the input section 16 when the music data playback section 17 is in operation. The second operation is similar to the first operation. Therefore, the same steps as the flowchart of the first operation shown in FIG. 5 are represented by the same reference numerals and its description is not repeated.

The situation that the music data playback section 17 is in operation means, for example, that after the music data playback control function 11a had operated the music data playback section 17 by the first operation, the operation ended in any step. In this situation, the music data playback section 17 is in operation, regardless of whether music data is being played back or not.

The music data playback control function 11a starts to operate based on a key operation of the input section 16, and from information in the control section 11, determines that the music data playback section 17 is in operation (Step S201).

The music data playback section 17 does not change the values of the current location 17b and the playlist order 17c.

The music data playback control function 11a requests the music data playback section 17 to send notification of the current location based on a key operation of the input section 16 or without depending on a key operation. In response to this request, the music data playback section 17 sends information regarding a folder or a playlist according to a folder or a playlist stored in the current location 17b. The music data playback control function 11a displays the notified information on the display section 15 (Step S202).

The operation of Step S202 is similar to the operation of Step S103. However, in Step S202 the node stored in the current location 17b may be a folder or a playlist. As a result, display by the operation of Step S202 becomes one of FIGS. 6 to 8.

The music data playback control function 11a determines whether the current location notified in Step S202 is "ROOT FOLDER" (the value to be notified is "ROOT FOLDER"), the "ALBUM LIST" folder (the values to be notified are "ROOT FOLDER" and "ALBUM LIST"), or "PLAYLIST 1" (the values to be notified are the values "ROOT FOLDER", "ALBUM LIST", and "PLAYLIST 1", and the playlist order) (Step S203).

When the notified current location is "ROOT FOLDER", the information regarding the current location notified in Step S202 is identical to the information regarding the current location notified in Step S103 of the first operation. Next, the music data playback control function 11a and the music data playback section 17 progresses to Step S104.

When the notified current location is the "ALBUM LIST" folder, the information regarding the current location notified in Step S202 is identical to the information regarding the current location notified in Step S105 of the first operation. Next, the music data playback control function 11a and the music data playback section 17 progresses to Step S106.

When the notified current location is the "PLAYLIST 1" folder, the information regarding the current location notified in Step S202 is identical to the information regarding the current location notified in Step S107 of the first operation. Next, the music data playback control function 11a and the music data playback section 17 progresses to Step S108. In Step S202, a value may be notified as the playlist order. When a value is notified as the playlist order, the music data playback control function 11a positions the cursor at the title of music to be identified by the playlist order.

When the music data playback section 17 sends the values "ROOT FOLDER" and "USER" or the values "ROOT FOLDER", "USER", and "PLAYLIST 2" in response to the request to notify the current location from the music data playback control function 11a in Step S202, the music data playback control function 11a temporarily changes the current location to "ROOT FOLDER" and then changes the current location to "USER" and further "PLAYLIST 2". To move the current location to "ROOT FOLDER", the current location is changed to the parent node until the current node reaches root node.

When the current location 17b has the values "ROOT FOLDER" and "USER" or the values "ROOT FOLDER", "USER", and "PLAYLIST 2", and the external storage medium is not connected to the external storage medium connection section 19, the music data playback section 17 stores the value "ROOT FOLDER" in the current location 17b, erases the value of the playlist order 17c, and in Step S202, sends the stored value and information based on the value to the music data playback control function 11a.

This is because the music data playback section 17 cannot send information regarding the child node of the node stored in the external storage medium, which is not connected to the external storage medium connection section 19. As a result, the music data playback control function 11a cannot play back music data according to a subtree structure, which root node is stored in the external storage medium.

The other situation that the music data playback section 17 is in operation means, for example, as described below, the near field transmitting/receiving section 22 operates the music data playback section 17 based on the operation of the music data playback remote control function 31a of the remote control device 30, and the music data playback section 17 is in operation. In this case, the music data playback section 17 may be playing back music data or not. In addition, the music data playback remote control function 31a may end the operation or not. A link by the near field communication network 40 may be disconnected or not.

(Third Operation)

The third operation is similar to the above-described first operation, and the flowchart of the third operation is the same as the flowchart of the first operation shown in FIG. 5. Therefore, only differences from the first operation will be described.

First, while in the first operation, the music data playback control function 11a requests the music data playback section 17 for folder-structured playlist information and causes playback of music data, in the third operation, the music data playback remote control function 31a of the remote control device 30 has such a function. As a result, the music data playback remote control function 31a operates based on a soft key operation of the input section 33, and control the display section 32 to display obtained information.

The request from the music data playback remote control function 31a is received by the near field transmitting/receiving section 22 through the near field communication network 40, and the notification from the music data playback section 17 in response to the request is transmitted by the near field transmitting/receiving section 22 through the near field communication network 40. In the mobile communication apparatus 10, the near field transmitting/receiving section 22 requests the music data playback section 17 for folder structured playlist information and receives the notification in response to the request, but for ease of understanding, a description will be provided on an assumption that the music data playback remote control function 31a has such a function.

For information exchange between the music data playback remote control function 31a and the music data playback section 17, communication by the near field communication network 40 is performed. Therefore, a music player is selected based on a signal from the remote control function 31a using the AVRCP profile. When a communication link of the near field communication network 40 is not established, it is regarded as that the music data playback remote control function 31a is not in operation. When the communication link of the near field communication network 40 is disconnected, it is regarded as that the operation of the music data playback remote control function 31a ends. When power supply to the remote control device 30 is cut off, it is regarded as that the operation of the music data playback remote control function 31a ends.

Second, in the third operation, the display section 32 and the input section 33 are implemented as a touch panel. For this reason, there is no concept that a cursor is positioned at one item in the list displayed on the display section 32, and the item at which the cursor is positioned is selected by a key operation, for example, an enter key operation. The items in the list are soft keys, and the user touches one of the soft keys so as to select an item corresponding to the soft key.

When the parent node, "UPPER-LEVEL FOLDER", is displayed as a soft key, the user touches the key so as to change the current location to the parent node of the location currently stored in the current location 17b.

Figure 10:
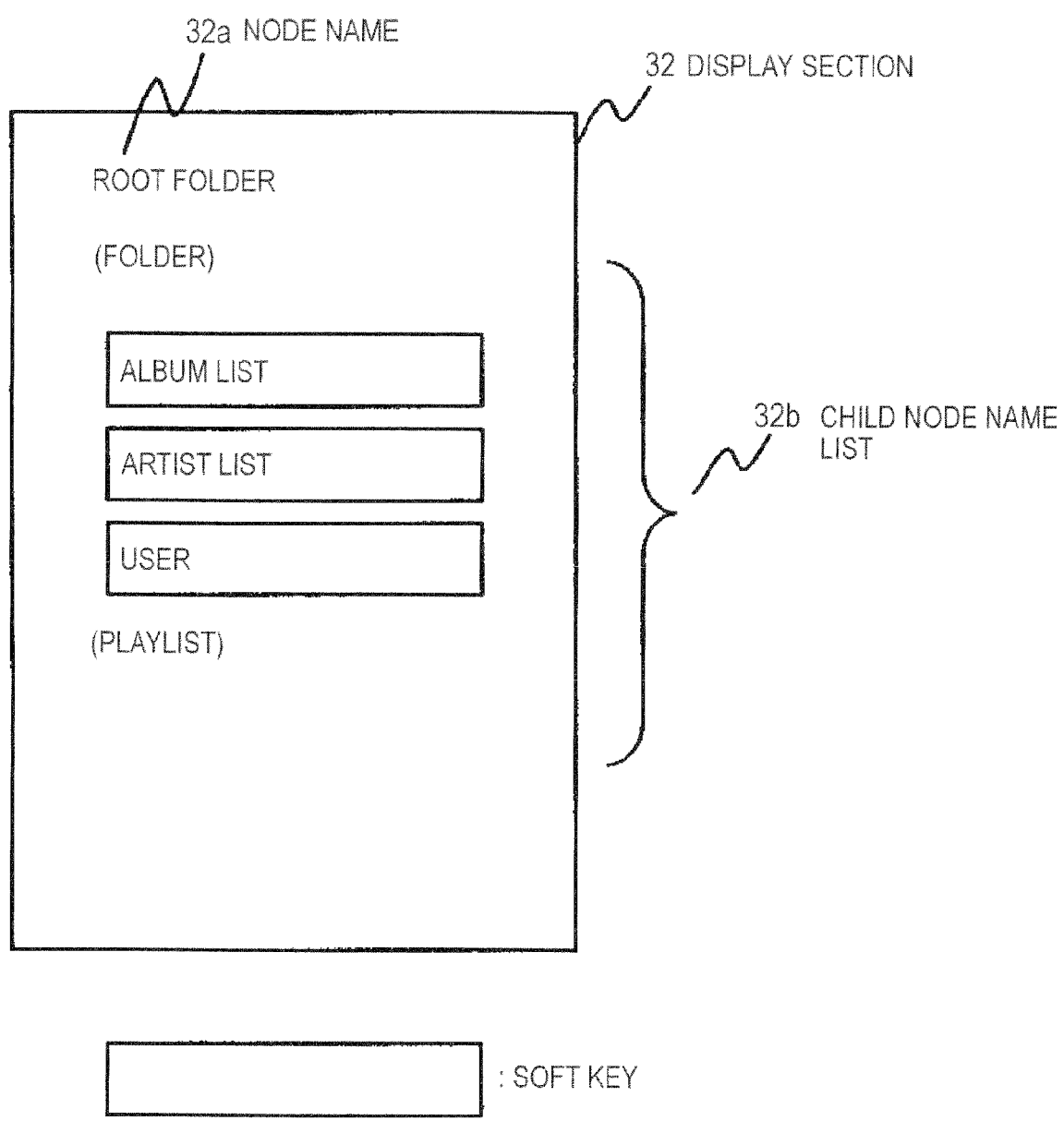
FIG. 10 is a diagram (first view) showing an example where a music data playback remote control function according to the embodiment of the invention displays information regarding a folder of a current location.
Figure 11:
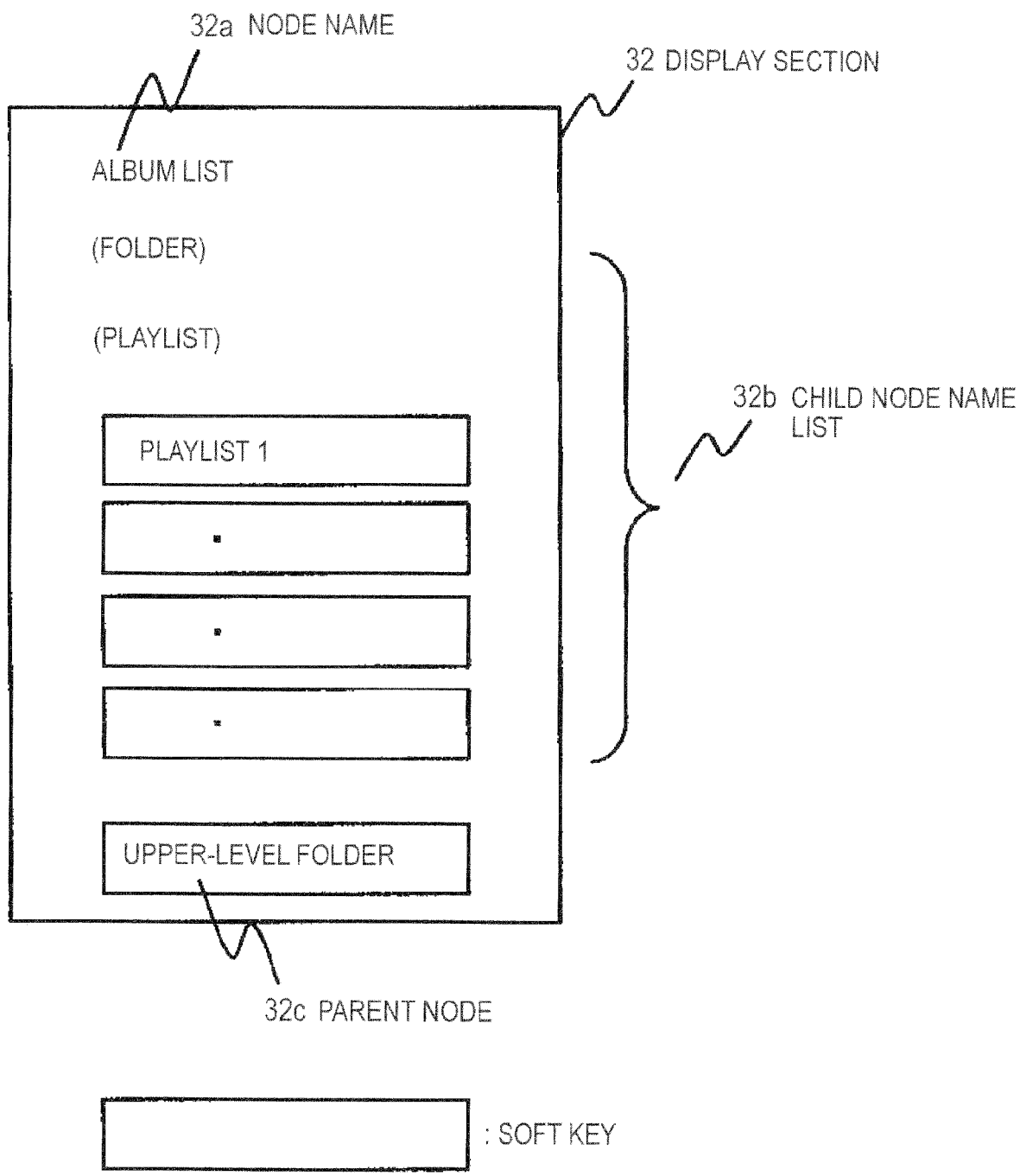
FIG. 11 is a diagram (second view) showing an example where a music data playback remote control function according to the embodiment of the invention displays information regarding a folder of a current location.
Figure 12:
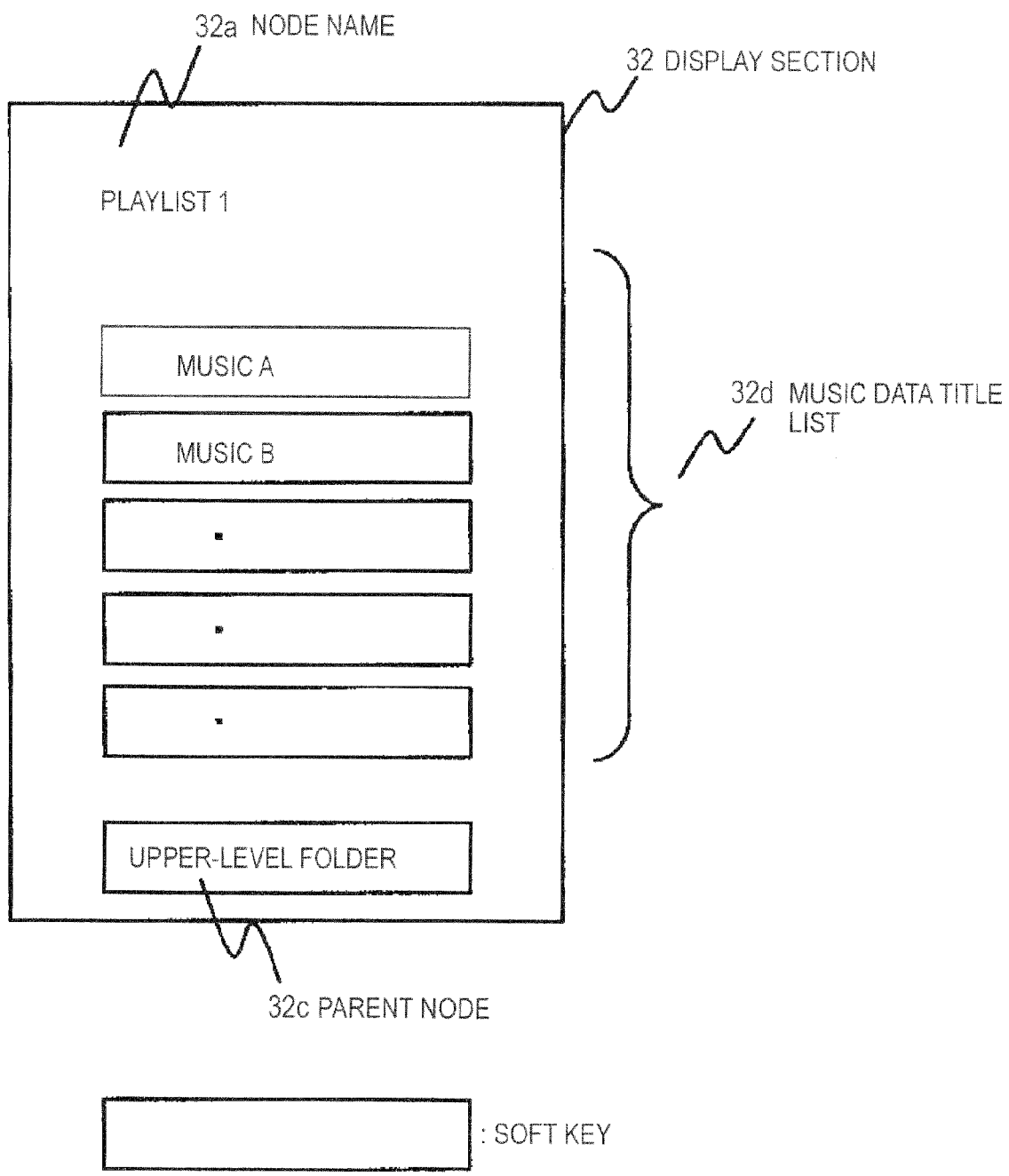
FIG. 12 is a diagram (first view) showing an example where the music data playback remote control function according to the embodiment of the invention displays information regarding a playlist of a current location.

The contents to be displayed on the display section 32 in Steps S103, S105, and S107 will be described with reference to FIGS. 10 to 12. FIGS. 10 to 12 correspond to FIGS. 6 to 8 of the first operation.

FIG. 10 shows the contents to be displayed on the display section 32 in Step S103. The display content of FIG. 10 includes node name, and the child node name list. The display content is same as the display content by the first operation. However, the cursor is not positioned at one of the node names of the child node name list 32b, and each child node name display is a soft key. In FIGS. 10 to 12, an item as a soft key is surrounded by a rectangle.

FIG. 11 shows the content to be displayed on the display section 32 in Step S105. The display content of FIG. 11 includes node name, child node name list 32b, and parent node 32c. The display content is same as the display content by the first operation. However, the cursor is not positioned, and each child node of the child node name list 32b and the parent node 32c are displayed as soft keys.

FIG. 12 shows the content to be displayed on the display section 32 in Step S107. The display content of FIG. 12 includes node name, music data title list, and parent node. The display content is same as the display content by the first operation. However, the cursor is not positioned, and each music data title of the music data title list 32*d* and the parent node 32*c* are displayed as soft keys.

(Fourth Operation)

The situation that the music data playback section 17 is in operation may mean that the music data playback remote control function 31*a* of the remote control device 30 operates the music data playback section 17 and ends. When the music data playback section 17 is in operation, the music data playback section 17 may be playing back music data or not. The fact that a link by the near field communication network 40 is disconnected is included in the concept that the music data playback remote control function 31*a* ends.

The other situation that the music data playback section 17 is in operation may mean that the music data playback control function 11*a* operates the music data playback section 17 and ends. When the music data play back section 17 is in operation, the music data playback section 17 may be playing back music data or not. In addition, the operation of the music data playback control function 11*a* may end or not.

A difference (referred to as first difference) between the fourth operation and the third operation is substantially identical to a difference (referred to as second difference) between the second operation and the first operation. Therefore, only a difference between the first difference and the second difference will be omitted.

During the second operation, when the information to be notified from the music data playback section 17 to the music data playback remote control function 31*a* in Step S202 are the values "ROOT FOLDER", "ALBUM LIST", and "PLAYLIST 1" and the playlist order 17*c*, when displaying the music data title list display 32*d*, the music data playback remote control function 31*a* identifiably displays the title of music to be identified by the playlist order.

Figure 13:
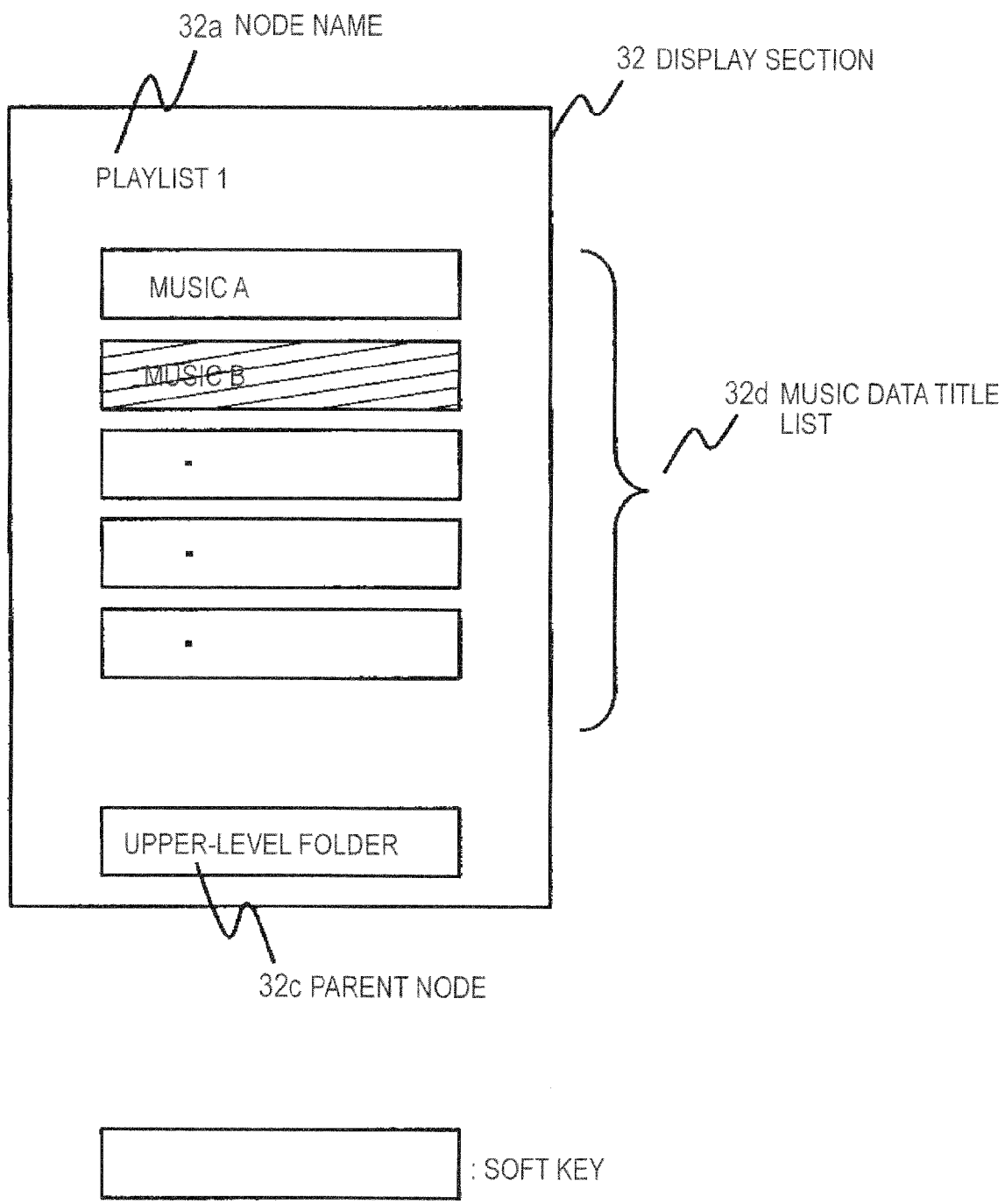
FIG. 13 is a diagram (second view) showing an example where the music data playback remote control function according to the embodiment of the invention displays information regarding a playlist of a current location.

FIG. 13 shows the content to be displayed on the display section 32 in Step S202. In the display content, display of the title of music data, "MUSIC B", in the music data title list is different from display of the titles of other music data. This is because the music data, "MUSIC B", is identified by the playlist order.

When the music data playback control function 11*a* of the mobile communication apparatus 10 and the music data playback remote control function 31*a* of the remote control device 30 control the music data playback section 17 of the mobile communication apparatus 10, an example of communication between the music data playback remote control function 31*a* and the music data playback section 17 will be described. A first example is that the music data playback control function 11*a* play back "MUSIC B" included in "PLAYLIST 1" by the first operation, and then the music data playback remote control function 31*a* play back "MUSIC A" included in the same playlist by the fourth operation.

Figure 14:
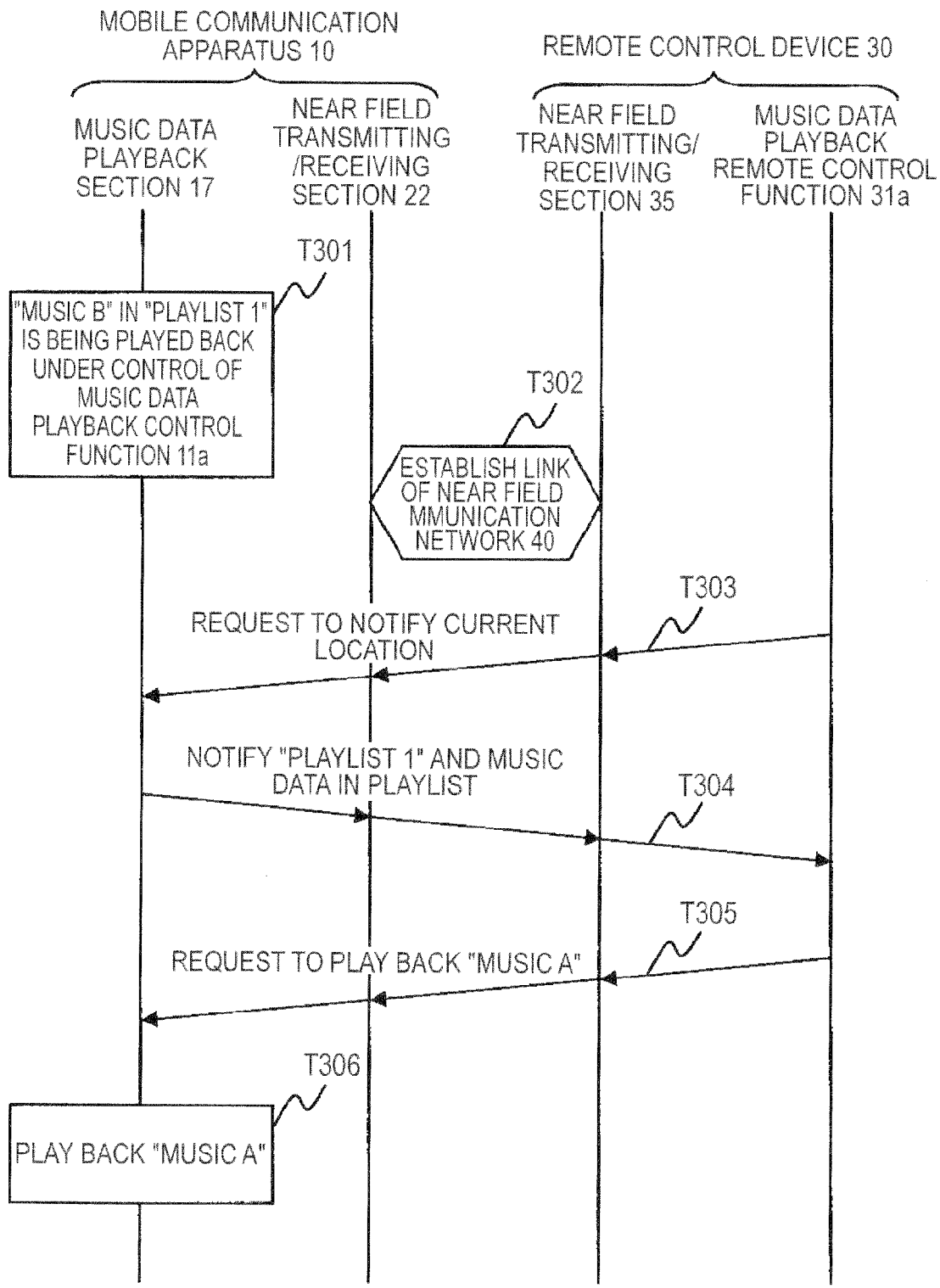
FIG. 14 is an exemplary sequence diagram (first view) of communication between the music data playback remote control function and the music data playback section when the music data playback control function and the music data playback remote control function according to the embodiment of the invention control the music data playback section.

FIG. 14 is a sequence diagram of communication between the music data playback remote control function 31*a* and the music data playback section 17 in the first example.

The music data playback section 17 is playing back "MUSIC B" included in the "PLAYLIST 1" by the first operation under the control of the music data playback control function 11*a* (T301, corresponding to Steps S101 to S108 in the flowchart of FIG. 5).

In order for the music data playback remote control function 31*a* to control the music data playback section 17, first, a link of the near field communication network 40 is established between the near field transmitting/receiving section 22 and the near field transmitting/receiving section 35 (T302). Next, the music data playback section 17 is selected as a music player (not shown), and the music data playback remote control function 31*a* transmits a request to notify the current location to the music data playback section 17 (T303, corresponding to Step S202 in the flowchart of FIG. 9).

Communication between the music data playback remote control function 31*a* and the music data playback section 17 necessarily passes through the near field transmitting/receiving section 22 and the near field transmitting/receiving section 35. In the description of the sequence, a description of communication through the near field transmitting/receiving section 22 and the near field transmitting/receiving section 35 will be omitted.

The music data playback section 17 transmits "PLAYLIST" as the current location, "MUSIC A", "MUSIC B", as the titles of music data included in "PLAYLIST 1", and "2" as the playlist order in response to the above request, and notifies that "MUSIC B" is being played back (T304, corresponding to Step S202 in the flowchart of FIG. 9: the notification content is identical to the notification content of Step S107 in the flowchart of FIG. 5). In this case, the display section 32 of the remote control device 30 displays screen image shown in FIG. 13.

If the user touches a portion of the display section 32, in which "MUSIC A" is displayed, with his/her finger, and the input section 33 detects the user's touch operation, the music data playback remote control function 31*a* requests playback of "MUSIC A", that is, requests playback of music data, the playlist order of which is "1", in "PLAYLIST 1" (T305, corresponding to Step S108 in the flowchart of FIG. 9). The music data playback section 17 plays back "MUSIC A" in response to the above request (T306, corresponding to Step S108 in the flowchart of FIG. 9).

As described above in connection with the first example, after the music data playback control function 11*a* controls the music data playback section 17, the music data playback remote control function 31*a* controls the music data playback section 17. Therefore, control can be turned over as if a single control function performs the control, without causing a useless operation of the user.

In a second example where the music data playback control function 11*a* of the mobile communication apparatus 10 and the music data playback remote control function 31*a* of the remote control device 30 control the music data playback section 17 of the mobile communication apparatus 10, communication between the music data playback remote control function 31*a* and the music data playback section 17 will be described. This example is that the music data playback remote control function 31*a* causes playback of music data by the second operation.

FIG. 15 is a sequence diagram of communication between the music data playback remote control function 31*a* and the music data playback section 17 in the second example. For the same sequence as the first example described with reference to FIG. 14, a simple description will be provided or a description will be omitted.

First, a link of the near field communication network 40 is established between the near field transmitting/receiving section 22 and the near field transmitting/receiving section 35 (T401). Next, the music data playback section 17 is selected as a music player, and the music data playback remote control function 31*a* transmits a request for the current location to the music data playback section 17 (T402, corresponding to Step S103 in the flowchart of FIG. 5).

The music data playback section 17 is not in operation before the above request is received, and thus the current location is set to "ROOT FOLDER" (corresponding Step S102 in the flowchart of FIG. 5). The current location "ROOT FOLDER" and the child nodes of the folder are notified (T403, corresponding to Step S103 in FIG. 5). Here, the display section 32 of the remote control device 30 displays screen image shown in FIG. 10.

If the user touches a portion, in which "ALBUM LIST" is displayed, in the display of FIG. 10, with his/her finger, and the input section 33 detects the user's touch operation, the music data playback remote control function 31a transmit a request to change the current location to "ALBUM LIST" and a request for the current location to the music data playback section 17 (T404, corresponding to Step S104 and S105 in the flowchart of FIG. 5).

The music data playback section 17 notifies the current location "ALBUM LIST" and the child nodes of the folder (T405, corresponding to Step S105 in FIG. 5). Here, the display section 32 of the remote control device 30 displays screen image shown in FIG. 11.

If the user touches a portion, in which "PLAYLIST 1" is displayed, in the display of FIG. 11 with his/her finger, and the input section 33 detects the user's touch operation, the music data playback remote control function 31a transmits a request to change the current location to "PLAYLIST 1" and a request for the current location to the music data playback section 17 (T406, corresponding to Steps S106 and S107 in the flowchart of FIG. 5).

The music data playback section 17 notifies the current location "PLAYLIST 1" and a group of titles of music data included in the playlist (T407, corresponding to Step S107 in FIG. 5). Here, display shown in FIG. 12 is performed on the display section 32 of the remote control device 30.

If the user touches a portion, in which "MUSIC A" is displayed, in the display of FIG. 12, with his/her finger, and the input section 33 detects the user's touch operation, the music data playback remote control function 31a requests playback of "MUSIC A", that is, requests playback of music data, the playlist order of which is "1", in "PLAYLIST 1" (T408, corresponding to Step S108 in the flowchart of FIG. 9). The music data playback section 17 plays back "MUSIC A" in response to the above request (T409, corresponding to Step S108 in the flowchart of FIG. 5).

As described above in connection with the second example, when the music data playback section 17 is not in operation, the music data playback remote control function 31a controls the music data playback section 17. Therefore, the user can be prevented from being conscious of presence/absence of control by the music data playback control function 11a, and the user can operate in accordance with his/her actual feeling.

(Other Operations)

Although in the foregoing description, the operations to create and edit the folder-structured playlist are omitted, in the folder-structured playlist, a subtree structure, in which a node having the folder name "ALBUM LIST" is set as a root node, and a subtree structure, in which a node having the folder name "ARTIST LIST" is set as a root node, are created when the contents download section downloads music data. A subtree structure, in which a node having the folder name "USER" is set as a root node, is created by the music data playback control function 11a based on a key operation of the input section 16, and by the music data playback remote control function 31a based on a soft key operation of the input section 33.

The music data may be a monaural signal or a stereo signal. However, when a stereo signal is generated from the speaker 17a, the speaker 17a includes two speakers. Music data may include video information, and the music data playback section 17 may display video to be played back on the display section 15.

In the foregoing description, music data played back by the music data playback section 17 is constantly output through the speaker 17a, that is, from the mobile communication apparatus 10, but the invention is not limited thereto. When a playback request is received from the music data playback remote control function 31a of the remote control device 30, the music data playback section 17 may transmit music data to be played back to the remote control device 30 through the near field communication network 40. The remote control device 30 may output the music data to be played back through a speaker for music data playback (not shown). A technique for transmitting music data in accordance with the profile of the Bluetooth (Registered Trademark) system is known.

In the foregoing description, the input section 16 of the mobile communication apparatus 10 includes key switches, and the input section 33 of the remote control device 30 is formed integrally with the display section 32 as a touch panel. Alternatively, the input section 16 of the mobile communication apparatus 10 may be formed integrally with the display section 15 as a touch panel. In addition, the input section 33 of the remote control device 30 may have key switches. In the touch panel, there is no concept that the cursor is changed between the items, and the same operation can be performed.

In the foregoing description, the music data playback section 17 notifies the name of the node of the current location 17b and the child nodes or playlists of the node in response to the request to notify the current location, but the invention is not limited thereto. The name of the node of the current location stored in the current location 17b may be notified. In this case, the music data playback control function 11a subsequently transmits, to the music data playback section 17, a request to notify the child nodes or playlists of the node with the name of the node of the current location as a parameter.

In the foregoing description, if the request to change the current location is received, the music data playback section 17 changes the current location and stores the current location in the current location 17b, but the invention is not limited thereto. When the request to notify the current location is received after the current location is stored in the current location 17b, the name of the node of the current location 17b and the child nodes or playlists of the node may be notified.

In the foregoing description, in the playback control system including the single mobile communication apparatus 10 and the single remote control device 30, the music data playback control function 11a of the mobile communication apparatus 10 and the music data playback remote control function 31a of the remote control device 30 control the music data playback section 17. However, the invention is not limited thereto.

A plurality of remote control devices 30 may be provided. That is, the music data playback control function 11a of the mobile communication apparatus 10 and the music data playback remote control functions 31a of a plurality of remote control devices 30 may control the music data playback section 17. The music data playback section 17 sequentially performs the requested operations in response to the received request, and thus it safely works when a number of devices transmit requests.

In the foregoing description, the embodiment in which the content player is applied to the mobile communication apparatus has been described. However, the invention is not limited to the mobile communication apparatus, and it may be applied to apparatuses which play back at least one of audio and video data, for example, a sound recorder, a picture recorder, and the like. The invention is not limited to the above configuration, and various modifications may be made.

What is claimed is:

1. A content player comprising:
   a control section;
   a near field communication module configured to be controlled by the control section and configured to perform a near field communication with a remote control device;
   a content storage section configured to be controlled by the control section and configured to store content data;
   a playlist storage section configured to be controlled by the control section and configured to store folders and playlists having a tree structure including a root folder as a root node and a plurality of playlists as leaf nodes, each playlist including a group of identification information of the content data;
   a current location storage section configured to be controlled by the control section and configured to store current location information indicating a current location of a node being selected in the playlist storage section;
   a current location notification module configured to be controlled by the control section and configured to control the near field communication module to send the current location information to the remote control device; and
   a playback module configured to be controlled by the control section and configured to:
      set the root folder as the current location;
      change the current location; and
      play back content data having the identification information being included in the playlist at the current location.

2. The content player of claim 1, further comprising a connection module configured to be controlled by the control section and configured to removably connect an external storage medium,
   wherein a proper subtree structure of the tree structure is stored in the external storage medium, and
   wherein the content player is configured to store information indicating the root folder in the current location storage section when the current location is a node included in the proper subtree structure and the external storage medium is removed from the connection module.

3. The content player of claim 1,
   wherein the near field communication module is configured to perform communication based on a Bluetooth communication system.

4. The content player of claim 1,
   wherein the content data includes music data.

5. A content player comprising:
   a control section;
   a near field communication module configured to be controlled by the control section and configured to perform a near field communication with a remote control device;
   a content storage section configured to be controlled by the control section and configured to store content data;
   a playlist storage section configured to be controlled by the control section and configured to store folders and playlists having a tree structure including a root folder as a root node and a plurality of playlists as leaf nodes, each playlist including a group of identification information of the content data;
   a current location storage section configured to be controlled by the control section and configured to store current location information indicating a current location of a node being selected in the playlist storage section;
   a playback module configured to be controlled by the control section and configured to play back content data having the identification information being included in the playlist; and
   a current location notification module configured to be controlled by the control section and configured to:
      control the near field communication module to send the current location information to the remote control device when: (i) the playback module is in operation, (ii) the content player is connected to the remote control device by the near field communication module, and (iii) a notification request for the current location is received from the remote control device, and
      control the near field communication module to send information indicating the root folder, as the current location information, to the remote control device when: (i) the playback module is not in operation, (ii) the content player is connected to the remote control device by the near field communication module, and (iii) the notification request is received from the remote control device.

6. The content player of claim 5,
   wherein the near field communication module is configured to perform communication based on a Bluetooth communication system.

7. The content player of claim 5,
   wherein the content data includes music data.

* * * * *